July 9, 1957 C. E. BRANICK 2,798,540
DEVICE FOR REMOVING PNEUMATIC TIRES FROM THEIR RIMS
Filed Jan. 31, 1955
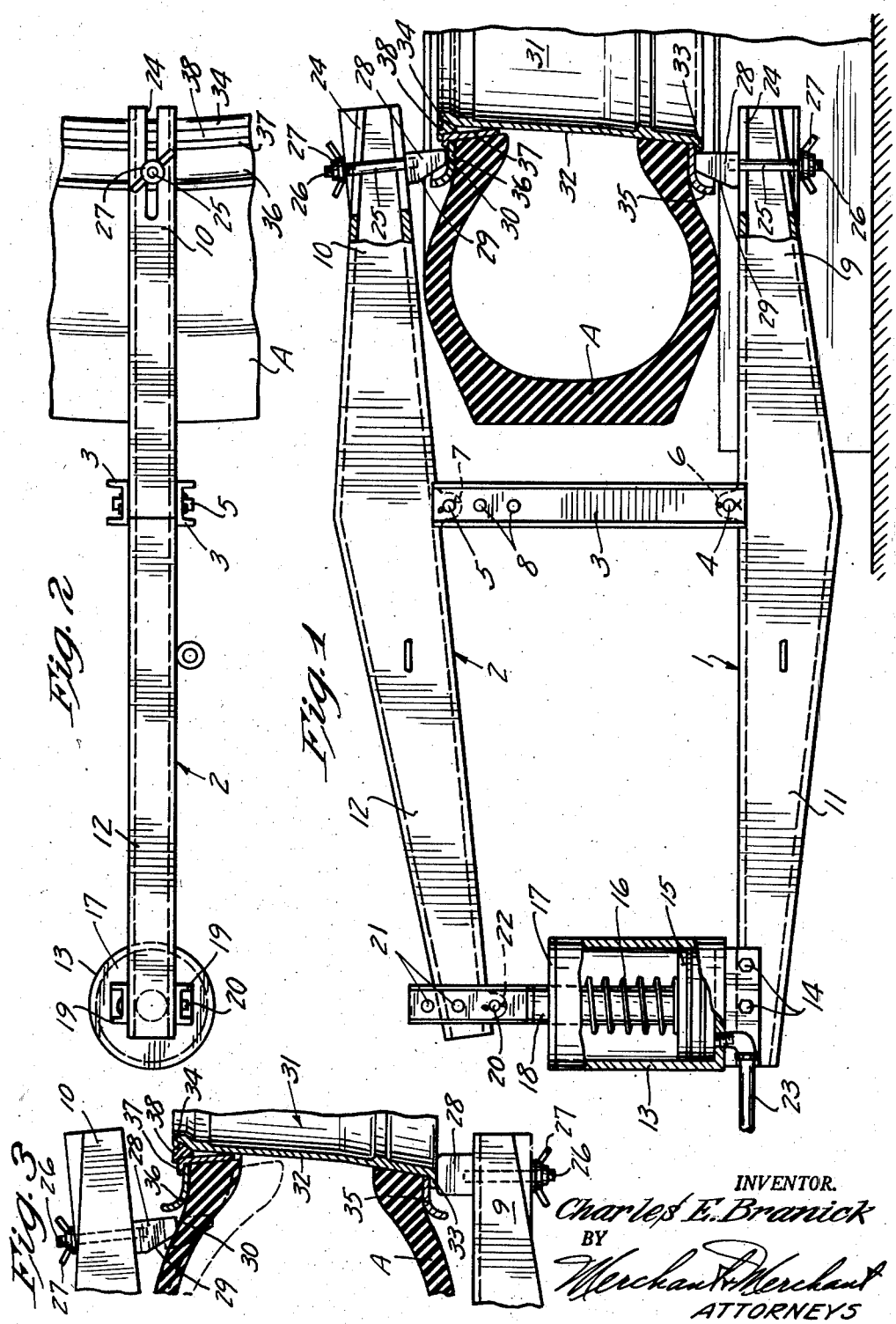
INVENTOR.
Charles E. Branick
BY
Merchant & Merchant
ATTORNEYS

United States Patent Office 2,798,540
Patented July 9, 1957

2,798,540

DEVICE FOR REMOVING PNEUMATIC TIRES FROM THEIR RIMS

Charles E. Branick, Fargo, N. Dak.

Application January 31, 1955, Serial No. 485,027

1 Claim. (Cl. 157—1.26)

My invention relates to mechanical devices for removing pneumatic tire casings from their rims and more particularly to those devices of this character which are power operated.

Still more specifically, my invention provides a device for loosening the tire beads of large earth mover type pneumatic tire casings from the rims upon which they are mounted.

The primary object of my invention is the provision of a device of the class described which is comprised of a minimum of working parts, which is extremely rugged and durable, and which has sufficient power to be utilized in conjunction with even the largest of earth mover or other pneumatic tire casings of large cross-sectional diameters.

A still further object of my invention is the provision of a device of the class described which is inexpensive to produce, which is extremely easy to operate, and which may be readily adjusted so as to be utilized on tire casings varying considerably in cross-sectional dimensions.

A still further object of my invention is the provision of a device of the class described, the pivotable jaws of which are provided with rotatably adjustable work engaging lugs of a shape to permit use of the device in numerous steps of both mounting and dismounting large size pneumatic tire casings to and from their rims.

The above and still further objects of my invention will become apparent from the following detailed specification, appended claims, and attached drawings:

Referring to the drawings, wherein like characters are indicated by like parts throughout the several views:

Fig. 1 is a view partly in side elevation and partly in transverse section showing my novel device in operation upon a rim mounted pneumatic tire casing, some parts being broken away and shown in section;

Fig. 2 is a view in top plan of the structure of Fig. 1; and

Fig. 3 is a fragmentary view corresponding generally to the structure of Fig. 1 but showing a different arrangement of some of the parts thereof.

Referring with greater particularity to the drawings, the numerals 1 and 2 indicate a pair of matched levers, preferably and as shown of hollow rectangular construction. Levers 1 and 2 are pivotally secured together at their intermediate portions by link means comprising spaced channel irons 3 through the opposite ends of which pivot pins 4 and 5 extend. Pivot pins 4 and 5 likewise extend through opposed ears 6 and 7 respectively, formed integrally with the levers 1 and 2. Preferably and as shown, the pivot pin 5 may be passed through any one of a number of longitudinally spaced openings 8 in the channel irons 3, for a purpose which will hereinafter become apparent. Channel irons 3 divide the levers 1 and 2 into cooperating jaws 9 and 10 at their outer ends, and into operating arms 11 and 12 at their inner ends. A cylinder 13 is secured by bolts or the like 14 to the free end portion of the operating arm 11. A piston 15 is mounted for reciprocal sliding movements within the cylinder 13 and is biased toward the position of Fig. 1, whereby to impart expanding movements to the jaws 9 and 10, by coil spring 16 interposed therebetween and the head 17. As shown, the coil spring 16 encompasses a plunger 18 which projects outwardly through an opening not specifically numbered in the head 17. At its outer end the plunger 18 is bifurcated as at 19 to receive therein the free end of the arm 12. Also preferably and as shown a pivot pin 20 projects through longitudinally spaced openings 21 in the bifurcated outer portion 19 of the plunger 18 and through an opening not numbered in ear 22 formed integrally with the arm 12. Fluid under pressure is introduced into and allowed to escape from the cylinder 13 below the piston 15 by means of a conduit 23 connected to a source of pressure and valving not shown.

Jaws 9 and 10 at their free ends are provided with longitudinally extended slots 24, which preferably and as shown open outwardly therefrom. Receivable in said slots 24 for longitudinal sliding movements are elongated clamping bolts 25 which are screw threaded at their outer end 26 and are there provided with thumb nuts 27. The opposed inner ends of the clamping bolts 25 are secured to the intermediate portions of work engaging lugs 28. Preferably and as shown, the lugs 28 are generally rectangular in form and are tapered at one side, as indicated at 29 to provide elongated working faces 30, the importance of which will hereinafter be explained in detail.

The tire casing shown on the drawings is identified by the letter A, whereas the rim is identified in its entirety by the numeral 31. Rim 31 is shown as comprising a primary annular wheel portion 32 having radially outwardly projecting annular lips 33 and 34 at its opposite side edges. Wheel 32 is shown as being of a smaller diameter at one side, namely adjacent the lip 34, than at the opposite side or adjacent the lip 33. Bead engaging flange 35 is adapted to abut against the lip 33. A similar bead engaging flange 36 is adapted to engage the opposite bead of the tire A and is anchored in position by means of an annular secondary rim section 37 and a lock ring 38. Obviously rim 31 is but one of several conventional types which may be utilized with pneumatic tires of the type in question and upon which it is possible to mount and dismount tires with my novel equipment above described.

When it is desired to dismount a pneumatic tire A from a rim 31, or alternatively to mount a tire casing A thereon, my novel apparatus is positioned as indicated in the drawings, to wit with the jaws 9 and 10 receiving the tire casing A transversely therebetween. The positioning of the work engaging lugs 28, that is both rotatably and longitudinally may be quickly achieved by loosening the thumb nuts 27 and a subsequent tightening thereof in the desired position. Thus, as shown in Fig. 1, it may be desirable to position the lugs 28 so that the elongated faces 30 thereof extend transversely of the jaws 9 and 10 and thus may be received within the relatively narrow flat portions of bead flanges 35 and 36 between their radially inner ends and their axially outwardly curved radially outer end portions. On the other hand, as shown in Fig. 3, it may be necessary to slidably move one of the lugs 28 inwardly within the slots 24, while moving the other lug 28 outwardly within said slots. Note that where a broader work engaging surface (longitudinally of the arms 9 and 10) is desired that the lug 28 is rotated 90 degrees.

My invention has been thoroughly tested and found to be completely satisfactory for the accomplishment of the above objects, and while I have disclosed a preferred embodiment thereof, it should be obvious that same is capable of modification without departure from the scope of the appended claim.

What I claim is:

In a device of the class described, a pair of substantially rectilinear spaced levers having connected inner and free outer ends, pivotal connecting means pivotally connecting the levers intermediate the ends thereof with the free outer ends constituting work engaging jaw portions and the inner ends constituting operating arms, the pivotal connecting means including link means pivotally connected to one of the levers and having openings therein for selectively pivotally connecting same to the other lever and providing adjustment of the distance between the levers to accommodate tires of various sizes between the jaw portions, fluid pressure operated means interposed between the operating arms and adapted to impart pivotal movement to said levers, said fluid pressure operated means being fixedly connected to one arm and pivotally connected to the other arm, said last mentioned pivotal connection comprising a plunger having openings therein for selectively positioning the plunger on said other arm, the free outer ends of the levers having open-ended elongated longitudinally extending slots extending to the outer ends of the jaw portions, work engaging lugs, one for each jaw portion, a bolt connecting each lug to a respective jaw portion for rotational and longitudinal adjustment thereon and passing through the respective slot, fastening means engaging said bolts for securing the lugs in adjusted position on the respective jaw portion, said lugs being substantially rectangular and having elongated working faces, one side of each lug being inclined toward the opposite side thereof.

References Cited in the file of this patent

UNITED STATES PATENTS

| | | |
|---|---|---|
| 422,733 | Shampel | Dec. 16, 1890 |
| 1,093,825 | Bryant | Apr. 21, 1914 |
| 1,435,595 | Fegeley et al. | Nov. 14, 1922 |
| 2,217,139 | Smith | Oct. 8, 1940 |
| 2,439,135 | Johnson et al. | Apr. 6, 1948 |
| 2,534,950 | Butterfield et al. | Dec. 19, 1950 |